United States Patent
Anson et al.

(10) Patent No.: US 8,726,001 B2
(45) Date of Patent: May 13, 2014

(54) OPTION-BASED REVERSE CONFIGURATION SYSTEM BY SELECTING AN INDIVIDUAL COMPONENT

(75) Inventors: Chad R. Anson, Austin, TX (US); Ryan M. Garcia, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1116 days.

(21) Appl. No.: 11/830,066

(22) Filed: Jul. 30, 2007

(65) Prior Publication Data
US 2009/0037711 A1 Feb. 5, 2009

(51) Int. Cl.
*G06F 9/00* (2006.01)
*G06F 9/24* (2006.01)
*G06F 15/177* (2006.01)
*G06F 17/00* (2006.01)
*G06F 9/44* (2006.01)

(52) U.S. Cl.
CPC *G06F 17/60* (2013.01); *G06F 9/44* (2013.01); *G06F 8/36* (2013.01)
USPC .......................................................... 713/100

(58) Field of Classification Search
CPC .............. G06F 17/60; G06F 8/36; G06F 9/44
USPC .............................................................. 713/1
See application file for complete search history.

(56) References Cited

U.S. PATENT DOCUMENTS

| | | | |
|---|---|---|---|
| 5,825,651 A | 10/1998 | Gupta et al. | 364/468.09 |
| 5,963,953 A | 10/1999 | Cram et al. | 707/102 |
| 6,247,128 B1 | 6/2001 | Fisher et al. | 713/100 |
| 6,466,836 B1 * | 10/2002 | Astarabadi | 700/115 |
| 6,754,816 B1 * | 6/2004 | Layton et al. | 713/1 |
| 6,785,805 B1 * | 8/2004 | House et al. | 713/1 |
| 7,039,604 B1 | 5/2006 | Srinivasan et al. | 705/26 |
| 7,159,106 B2 * | 1/2007 | Meaney et al. | 713/2 |
| 7,360,071 B2 * | 4/2008 | Ewing et al. | 713/1 |
| 7,627,745 B2 * | 12/2009 | Martinez et al. | 713/2 |
| 2004/0024656 A1 * | 2/2004 | Coleman | 705/27 |
| 2008/0059782 A1 * | 3/2008 | Kruse et al. | 713/1 |

* cited by examiner

*Primary Examiner* — Mohammed Rehman
(74) *Attorney, Agent, or Firm* — Terrile, Cannatti, Chambers & Holland, LLP; Stephen A. Terrile

(57) ABSTRACT

A configurator is provided with the ability to enable a customer to configure a system based upon selection of components to reside within the system. Based upon selected components, the customer is presented with systems in which the selected components can reside.

10 Claims, 5 Drawing Sheets

OPTION-BASED REVERSE CONFIGURATION SYSTEM BY SELECTING AN INDIVIDUAL COMPONENT

BACKGROUND OF THE INVENTION

1. Field of the Invention

The present invention relates to information handling systems and more particularly to option-based reverse configuration systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Known configurator systems begin with a consumer selecting an overall case chassis and then being presented with a series of choices for options that fit within the chassis. This process can limit the options available to the consumer and may actually lead a consumer to choose another computer company if they believe a certain processor, hard drive size, or other option is not available. It is known to allow configurator systems to trigger an event that allows for the consumer to be upgraded in terms of chassis. However, unless that event also forces the consumer to begin the configuration process anew, the consumer may not be informed of all potential options available for purchase.

Although there is a balance between presenting a simple method of customizing a computer and presenting a complicated list of options for consumers, known configurator systems do not include an option for more sophisticated users who may become frustrated at having to search multiple models to find the one or two options which drive their current purchase. For example, FIG. 1, labeled Prior Art, shows a known configurator system. In this system, users choose base models without any notion of what components are available for that model. When a user has made their choice they have unknowingly limited themselves to a subset of component options.

Accordingly, it would be desirable to provide a configurator system with an ability to perform an option-based reverse configuration.

SUMMARY OF THE INVENTION

In accordance with the present invention, a configurator system with an ability to perform an option-based reverse configuration is set forth.

In one embodiment, the invention relates to a method for configuring an information handling system which includes configuring the information handling system with options selected according to user input. The configuring comprises enabling a user to initiate a configuration of the information handing system by selecting an individual component, presenting a list of options corresponding to a selected individual component enabling the user to select an option from the list of options, and configuring the information handling system to include a selected option.

In another embodiment, the invention relates to a system for configuring an information handling system which includes a configurator and a database. The configurator enables a user to initiate a configuration of the information handing system by selecting individual components and presents a list of options corresponding to a selected individual component. The database receives information from and supplies information to the configurator based upon options selected during the reverse configuration operation.

In another embodiment, the invention relates to an apparatus for configuring an information handling system which includes means for configuring the information handling system with options selected according to user input. The means for configuring comprise means for enabling a user to initiate a configuration of the information handing system by selecting an individual component, means for presenting a list of options corresponding to a selected individual component, means for enabling the user to select an option from the list of options, and means for configuring the information handling system to include a selected option.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An on-line store is one component of an Internet website to which a customer may go to configure a particular information handling system, for example, according to desired options of the customer. The on-line store is typically a subset of a larger Internet website. At the on-line store, a customer can select one or more products in which the customer is interested. Upon selection of a particular product, the on-line store presents the customer with the ability to go to the product information for the particular product, customize the product, price the customized product, purchase the product, and other actions as discussed herein. While shopping happens in the website (i.e., selection of a particular kind of system by a customer), when the customer is ready to purchase a customized system, the customer is then directed to that part of the website which the on-line store application controls.

Figure 1:
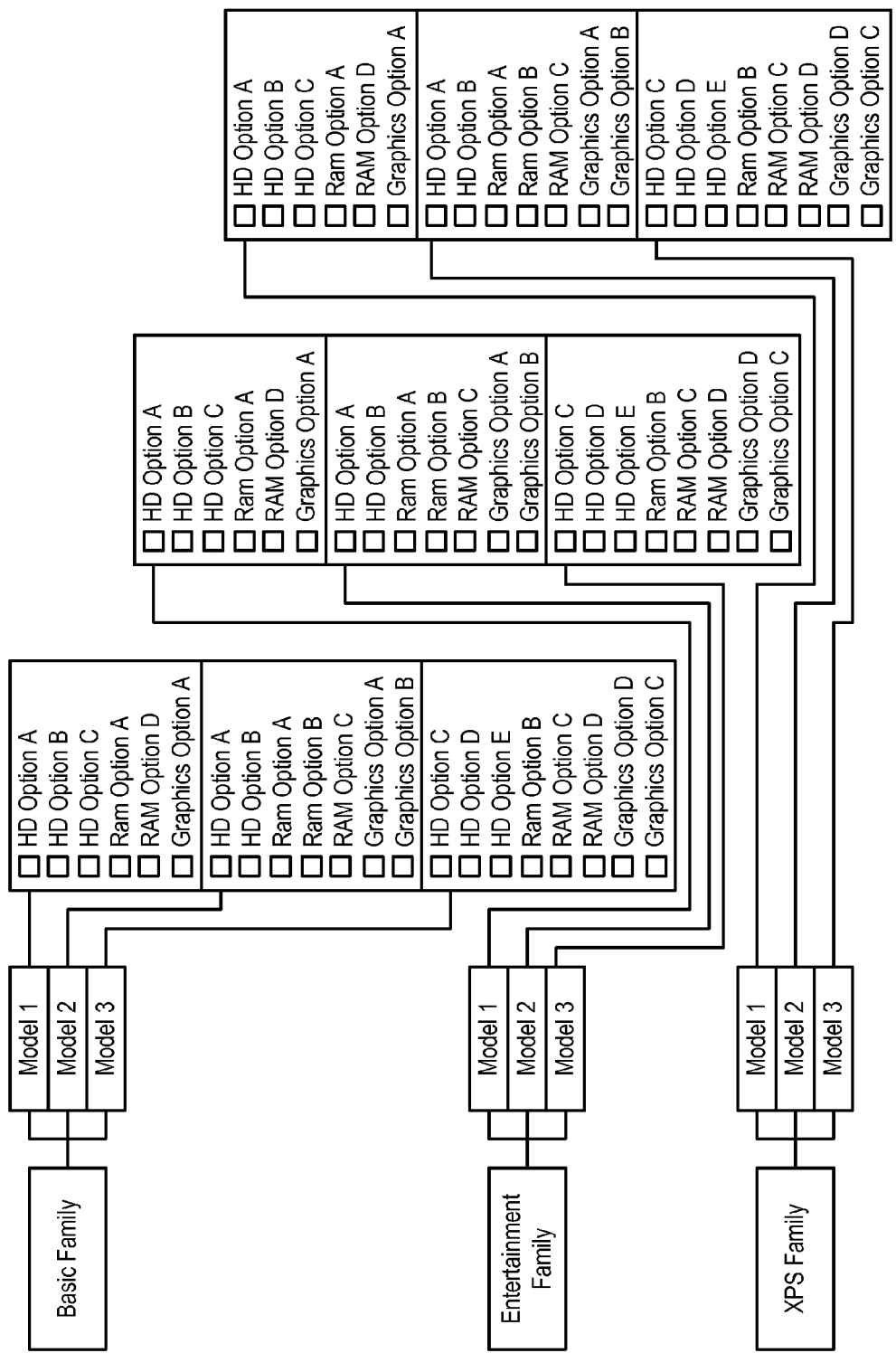
FIG. 1, labeled Prior Art, shows a block diagram of the operation of a configurator system.
Figure 2:
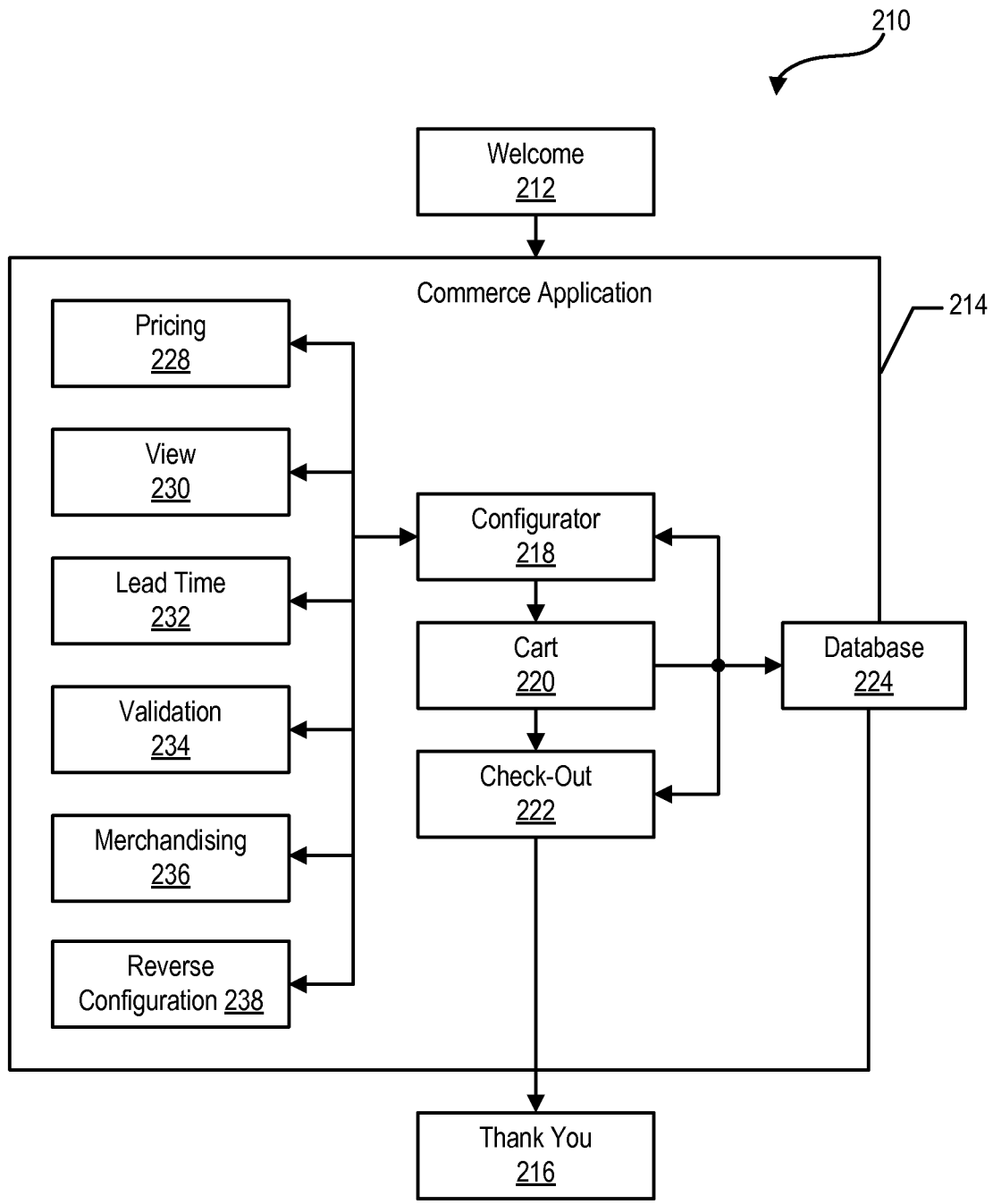
FIG. 2 shows an overview block diagram representation of an on-line store.

Referring now to FIG. 2, an on-line store 210 for use in generating customer configured information handling systems, e.g., customer configured computer systems, is shown. The on-line store 210 includes a welcome or introductory module 212, a commerce application module 214, and a thank you module 216. The on-line store 210 includes an on-line store user interface which enables the system configuration, pricing, and ordering of an information handling system via the Internet. The commerce application 214 includes a configurator 218, shopping cart 220, a checkout module 222, and database 224. The database 224 provides information to the configurator 218, shopping cart 220, and checkout module 222. The configurator 218 includes a pricing module 228, a view module 230, a lead time warning module 232, a validation (or compatibility) warning module 234, a merchandising module 236 as well as a reverse configuration module 238. The various modules of the configurator 218 are driven by data from the database 224, and thus the configurator 218, shopping cart 220, and checkout module 222 are all linked to the database 224.

In operation of the on-line store 210, the welcome module 212 presents a welcome page 212, the configurator 218 presents a configurator page (the reverse configuration module 238 enables presentation of a reverse configuration page such a customer so desire), the shopping cart 220 presents a shopping cart page, the checkout module 222 presents a checkout page, and the thank you module 216 presents a thank you page. The welcome page includes a static page and generally resides outside of the commerce application 214. The configurator page, shopping cart page, and checkout page are within the commerce application and use information provided by the database. The checkout includes a payment feature, delivery feature, personal verses business feature, and instructional text features (i.e., how to fill out an on-line form.)

The welcome page is typically an introductory page and includes a link into the on-line store 210. The welcome page is typically a static welcome page. Upon completion of configuration of a system, the customer is transferred to a checkout page. After completion of the checkout, the customer is transferred to a static thank you page 216. The thank you page 216 provides a message of gratitude to the customer for having placed the order or for visiting the on-line store.

Aspects of the configurator 218 which interact with database 224 are shown in FIG. 2. In essence, the entire commerce application 214 interacts with the database. The configurator 218, shopping cart 220, and checkout module 222 are each part of the commerce application 214 and interact with the database 224. For example, with the shopping cart 220, additional merchandising information associated with a particular system which has been configured and placed in the shopping cart by an on-line store customer can be provided.

The reverse configuration module 238 provides the configurator 218 with the ability to enable a customer to start the configuration of an information handling system based upon selection of components to reside within the system (as compared with starting a configuration based upon selecting a system in which components will reside). Based upon selected components, the customer is presented with systems in which the selected components can reside.

Figure 3:
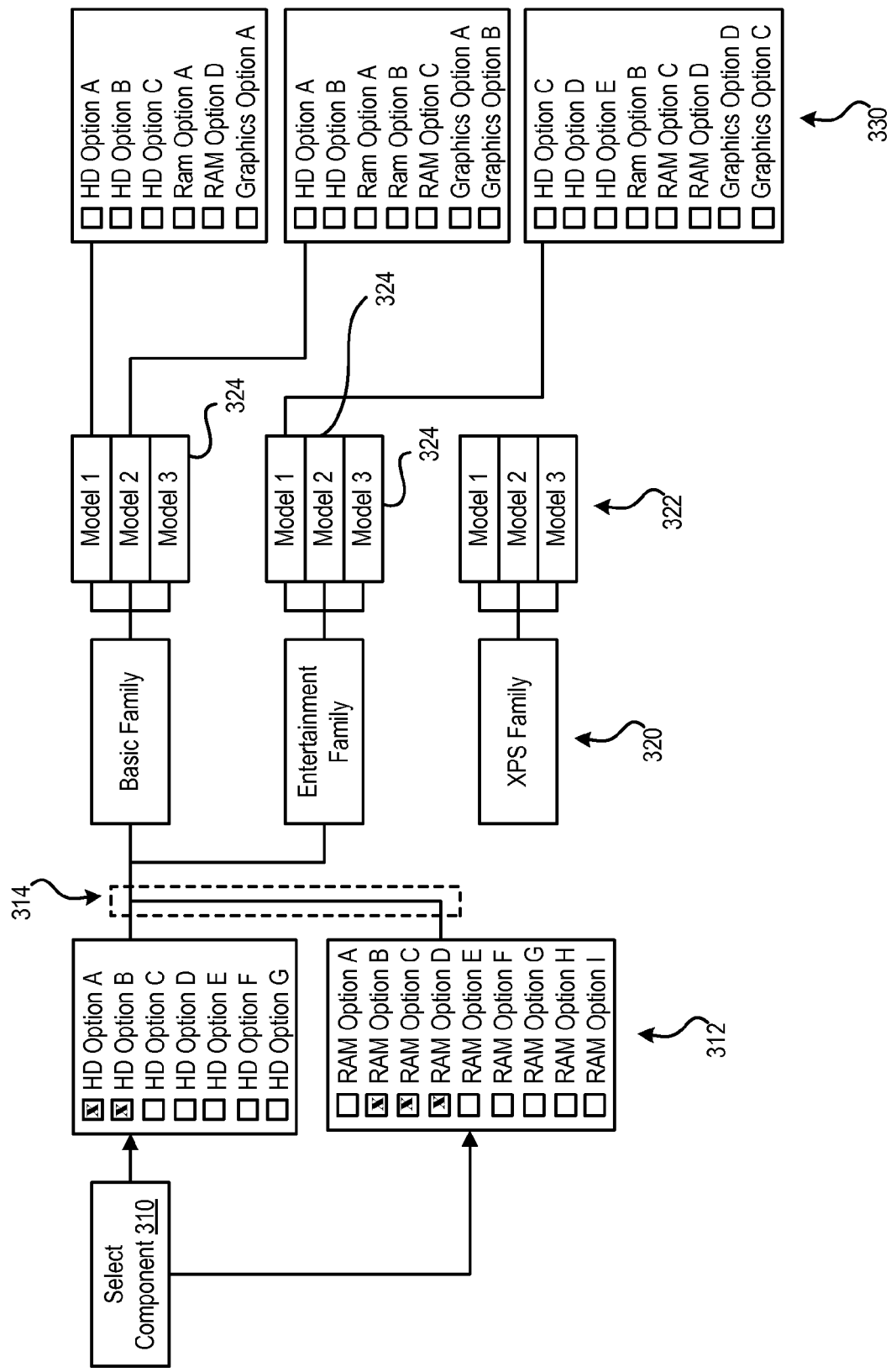
FIG. 3 shows a block diagram of the operation of an option based configurator system.

Referring to FIG. 3, the reverse configuration module 238 allow a user to enter into a reverse configuration mode of operation as compared to a typical configurator. In the reverse configuration mode of operation, users are prompted to select individual components at step 310. The user is then presented with all available options for those components regardless of base model at step 312. The user may select one or a plurality of desired options.

When the user makes a selection, the reverse configuration module 328 performs a lookup function via the database 224 at step 314. For example, based upon a particular hard drive selection and a particular memory option selection, the lookup might determine that information handling system models corresponding to a basic family and an entertainment family are available for the selected components.

The user is then informed (via e.g., a screen presentation) of which families of models and which information handling system models allow for these component options at steps 320 and 322, respectively. The user may also be informed that certain models, e.g., models 324, are not available for certain component selections. When the user selects a particular model for continued configuration, the user can then continue the normal customization process via the configurator or continue to set universal options to further limit or broaden their model selection at step 330. The options presented at step 330 are limited by the particular model that is selected by the user at step 322.

Such a reverse configuration operation not only presents a broader universe of components to an end user but also converts potential sales by not leading consumers into thinking a certain option is unavailable. Additionally, such a reverse configuration operation prevents user frustration from having to repeatedly start the configuration process over to locate a particular component option that might be important to the user. While reverse configuration operation is not necessarily an option to be used by unsophisticated users, consumers with greater technical experience (e.g., information technology (IT) staff, large corporate purchasers, home users with high need for customization) greatly benefit from such a purchase option.

Figure 4:
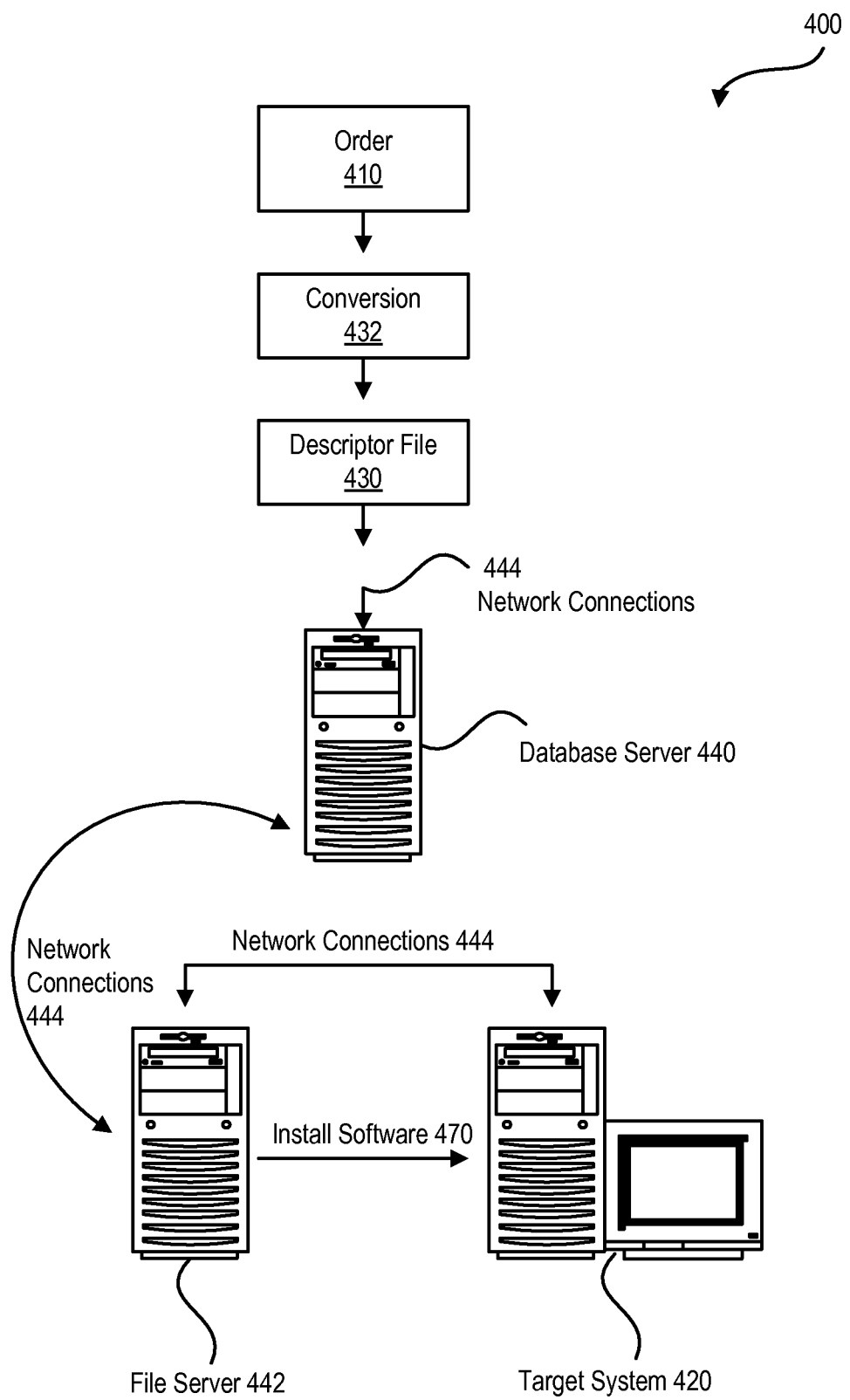
FIG. 4 shows a schematic diagram of a system for installing software.

FIG. 4 is a schematic diagram of a software installation system 400 at an information handling system manufacturing site. In operation, an order 410 is placed to purchase a target information handling system 420, via, e.g., the on-line store. The target information handling system 420 to be manufactured contains a plurality of hardware and software components (including components that were selected via the reverse configuration process). For instance, target information handling system 420 might include a certain brand of hard drive, a particular type of monitor, a certain brand of processor, as well as particular software products and preordered services. The software may include a particular version of an operating system along with all appropriate driver software and other application software along with appropriate software bug fixes. Before target information handling system 420 is shipped to the customer, the plurality of components are installed and tested. Such software installation and testing advantageously ensures a reliable, working information handling system which is ready to operate when received by a customer.

The installation includes installing components based upon the reverse configuration operation. The testing includes testing for components that were installed based upon the reverse configuration operation.

Because different families of information handling systems and different individual computer components may require different software installations, it is desirable to determine which software to install on a target information handling system 420. A descriptor file 430 is provided by converting an order 410, which corresponds to a desired information handling system having desired components, into a computer readable format via conversion module 432. The descriptor file 430 includes component descriptors corresponding to components determined to be desirable based upon the system validation process.

Component descriptors are computer readable descriptions of the components of target information handling system 420 which components are defined by the order 410. In a preferred embodiment, the component descriptors are included in a descriptor file called a system descriptor record (SDR) which is a computer readable file containing a listing of the components, both hardware and software, to be installed onto target information handling system 420. Having read the plurality of component descriptors, database server 440 provides an image having a plurality of software components corresponding to the component descriptors to file server 442 over network connection 444. Network connections 444 may be any network connection well-known in the art, such as a local area network, an intranet, or the internet. The information contained in database server 440 is often updated such that the database contains a new factory build environment. The software is then installed on the target information handling system 420 via file server 442. The software is installed on the target information handling system via the image. The image may include self-configuring code.

The components also include media components. The media components enable the target information handling system 420 to function as a media center edition (MCE) information handling system. The media components include a media configuration file as well as components for interacting with and controlling various media devices.

Figure 5:
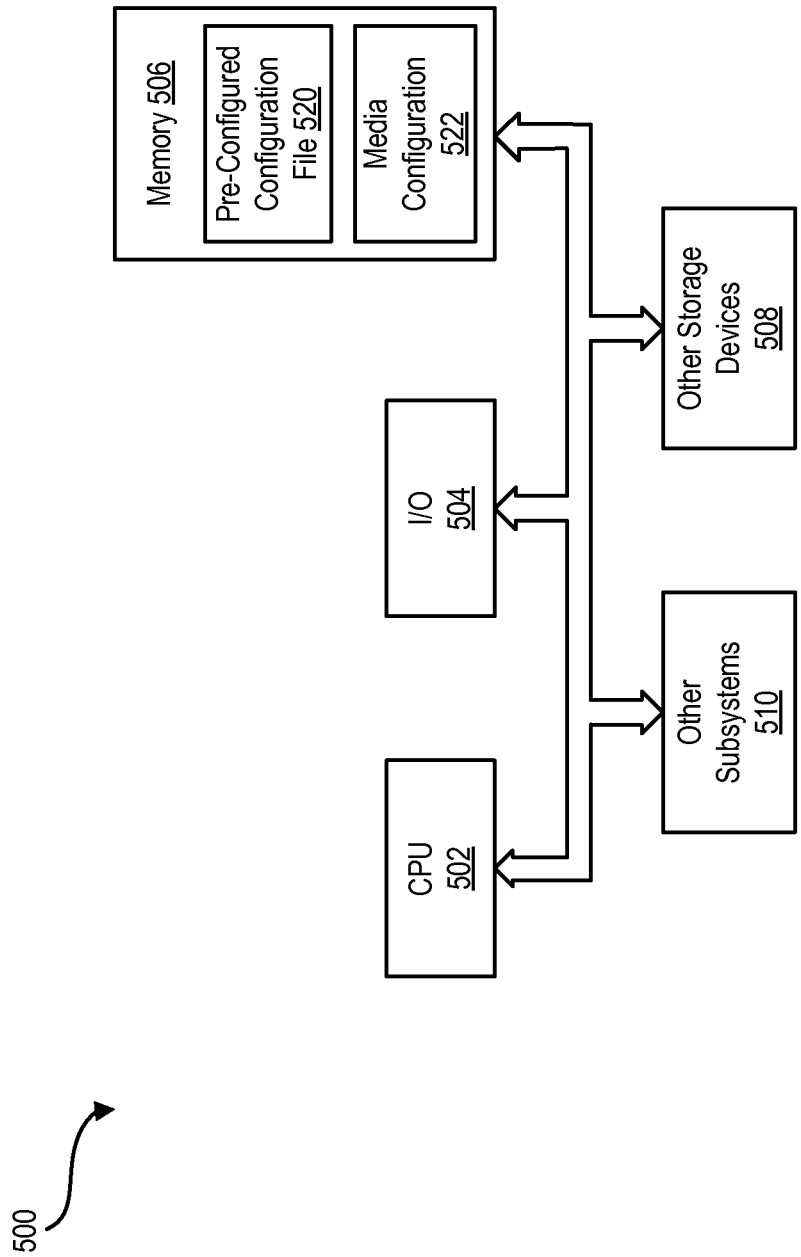
FIG. 5 shows a flow chart of an information handling system configured using the option based configurator system.

Referring to FIG. 5, a system block diagram of an information handling system 500 such as target information handling system 420 is shown. The information handling system 500 includes a processor 502, input/output (I/O) devices 504, such as a display, a keyboard, a mouse, and associated controllers, memory 506 including non-volatile memory such as a hard disk drive and volatile memory such as random access memory, and other storage devices 508, such as an optical disk and drive and other memory devices, and various other subsystems 510, all interconnected via one or more buses, shown collectively as bus 512. The information handling system 500 includes components that were selected by the user via the reverse configuration operation.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Also for example the reverse configuration module can interactively present how various component options are dependent upon each other. Thus, a user can be informed of how a particular option choice might reduce other component options. For example if a user chose a certain type of operation system, only certain memory component choices (e.g., certain amounts of memory or certain types of memory) might be available.

Consequently, the invention is intended to be limited only by the spirit and scope of the appended claims, giving full cognizance to equivalents in all respects.

What is claimed is:

1. A method for configuring an information handling system, the method enabling a customer to start configuring the information handling system based upon selection of components to reside in the information handling system, the method comprising:

configuring the information handling system with options selected according to user input, the configuring comprising:
enabling a user to initiate a reverse configuration operation of the information handling system by selecting an individual component, the reverse configuration operation prompting the user to select an individual component to reside within a configured information handling system;
presenting a list of options corresponding to a selected individual component;
enabling the user to select an option from the list of options; and,
configuring the information handling system to include a selected option; and wherein the user is enabled to select a plurality of options from the list of options, at least one of the plurality of options corresponding to software to be preinstalled on the configured information handling system; and, the presenting presents a list of families in which the selected plurality of options reside, the list of families corresponding to different families of information handling systems, the different families of information handling systems requiring different software installations, the different families of information handling systems comprising a basic family of information handling systems and an entertainment family of information handling systems.

2. The method of claim 1 wherein the configuring further comprises:

presenting a list of models in which the selected option may reside.

3. The method of claim 1 wherein the configuring further comprises:

presenting a list of models in which the selected option do not reside.

4. A system for configuring an information handling system, the system enabling a customer to start configuring the information handling system based upon selection of components to reside in the information handling system, the system comprising:

a configurator, the configurator enabling a user to initiate a reverse configuration operation of the information handing system by selecting individual components, the reverse configuration operation prompting the user to select an individual component to reside within a configured information handling system;

presenting a list of options corresponding to a selected individual component; and, a database, the database receiving information from and supplying information to the configurator based upon options selected during the reverse configuration operation; and wherein the user is enabled to select a plurality of options from the list of options, at least one of the plurality of options corresponding to software to be preinstalled on the configured information handling system; and, the presenting presents a list of families in which the selected plurality of options reside, the list of families corresponding to different families of information handling systems, the different families of information handling systems requiring different software installations, the different families of information handling systems comprising a basic family of information handling systems and an entertainment family of information handling systems.

5. The system of claim 4 wherein:

the information supplied by the database includes information relating to models available based upon options selected during the reverse configuration operation.

6. The system of claim 4 wherein the configuring:

presents a list of models in which the selected option may reside.

7. The system of claim 4 wherein the configuring:

presents a list of models in which the selected option do not reside.

8. An apparatus for configuring an information handling system, the apparatus enabling a customer to start configuring the information handling system based upon selection of components to reside in the information handling system, the apparatus comprising:

means for configuring the information handling system with options selected according to user input, the means for configuring comprising:

means for enabling a user to initiate a reverse configuration operation of the information handing system by selecting an individual component, the reverse configuration operation prompting the user to select an individual component to reside within a configured information handling system;

means for presenting a list of options corresponding to a selected individual component;

means for enabling the user to select an option from the list of options; and, means for configuring the information handling system to include a selected option; and wherein the user is enabled to select a plurality of options from the list of options, at least one of the plurality of options corresponding to software to be preinstalled on the configured information handling system; and, the means for presenting presents a list of families in which the selected plurality of options reside, the list of families corresponding to different families of information handling systems, the different families of information handling systems requiring different software installations, the different families of information handling systems comprising a basic family of information handling systems and an entertainment family of information handling systems.

9. The apparatus of claim 8 wherein the means for configuring further comprises:

means for presenting a list of models in which the selected option may reside.

10. The apparatus of claim 8 wherein the means for configuring further comprises:

means for presenting a list of models in which the selected option do not reside.

* * * * *